US011099790B2

(12) United States Patent
Bhimani et al.

(10) Patent No.: US 11,099,790 B2
(45) Date of Patent: Aug. 24, 2021

(54) PARALLEL KEY VALUE BASED MULTITHREAD MACHINE LEARNING LEVERAGING KV-SSDS

(71) Applicant: SAMSUNG ELECTRONICS CO., LTD., Suwon-si (KR)

(72) Inventors: Janki Bhimani, Billerica, MA (US); Jingpei Yang, San Jose, CA (US); Changho Choi, San Jose, CA (US)

(73) Assignee: Samsung Electronics Co., Ltd., Suwon-si (KR)

( * ) Notice: Subject to any disclaimer, the term of this patent is extended or adjusted under 35 U.S.C. 154(b) by 201 days.

(21) Appl. No.: 16/528,492

(22) Filed: Jul. 31, 2019

(65) Prior Publication Data

US 2020/0225883 A1 Jul. 16, 2020

Related U.S. Application Data

(60) Provisional application No. 62/863,558, filed on Jun. 19, 2019, provisional application No. 62/790,705, filed on Jan. 10, 2019.

(51) Int. Cl.
*G06F 3/06* (2006.01)
*G06N 20/00* (2019.01)
*G06F 16/245* (2019.01)
*G06K 9/62* (2006.01)

(52) U.S. Cl.
CPC ............ *G06F 3/0679* (2013.01); *G06F 3/061* (2013.01); *G06F 3/0655* (2013.01); *G06N 20/00* (2019.01)

(58) Field of Classification Search
CPC ...... G06F 3/0679; G06F 3/0655; G06F 3/061; G06F 16/24569; G06N 20/00; G06K 9/6218

See application file for complete search history.

(56) References Cited

U.S. PATENT DOCUMENTS

| 6,269,376 | B1 | 7/2001 | Dhillon et al. |
| 9,378,266 | B2 | 6/2016 | Kim et al. |
| 9,612,955 | B2* | 4/2017 | Akella ............... G06F 12/0246 |
| 9,740,688 | B2* | 8/2017 | Huang .................. G06F 40/44 |
| 10,083,118 | B2 | 9/2018 | Jeong et al. |

(Continued)

FOREIGN PATENT DOCUMENTS

| CN | 102707955 A | 10/2012 |
| CN | 104461466 A | 3/2015 |

(Continued)

OTHER PUBLICATIONS

Samsung, "Samsung Key Value SSD enables High Performance Scaling", 2017, pp. 1-8, https://www.samsung.com/semiconductor/global.semi.static/Samsung_Key_Value_SSD_enables_High_Performance_Scaling-0.pdf (Year: 2017).*

(Continued)

*Primary Examiner* — Christopher D Birkhimer
(74) *Attorney, Agent, or Firm* — Lewis Roca Rothgerber Christie LLP

(57) ABSTRACT

A system for parallel computing leveraging the use of a key value solid state drive. The system including a modified set of compiler directives that enable the use of parallel compute and data threads. The system may further include a concurrency manager to ensure that the parallel data threads are operated in a thread-safe manner.

20 Claims, 6 Drawing Sheets

(56) References Cited

U.S. PATENT DOCUMENTS

| | | | |
|---|---|---|---|
| 10,175,951 B2 * | 1/2019 | Stanfill | G06F 8/34 |
| 10,228,922 B2 | 3/2019 | Boehm et al. | |
| 2012/0239871 A1 * | 9/2012 | Badam | G06F 12/0246 711/104 |
| 2014/0195720 A1 * | 7/2014 | Akella | G06F 12/0246 711/103 |
| 2015/0302111 A1 | 10/2015 | Yue et al. | |
| 2015/0324441 A1 | 11/2015 | Zhou | |
| 2016/0099810 A1 | 4/2016 | Li et al. | |
| 2018/0357234 A1 * | 12/2018 | De | G06F 16/24569 |
| 2019/0019107 A1 | 1/2019 | Kachare et al. | |

FOREIGN PATENT DOCUMENTS

| | | |
|---|---|---|
| CN | 107423764 A | 12/2017 |
| CN | 108364026 A | 8/2018 |

OTHER PUBLICATIONS

Anonymous, "Build a Key Value Flash Disk Based Storage System", Flash Memory Summit, 2017, pp. 1-14, https://www.flashmemorysummit.com/English/Collaterals/Proceedings/2018/20180807_BMKT-101-1_Zha.pdf (Year: 2017).*

Janki Bhimani, et al., "Accelerating K-Means Clustering with Parallel Implementations and GPU Computing", 2015 IEEE High Performance Extreme Computing Conference (HPEC), Sep. 2015, 6 pgs., https://ieeexplore.ieee.org/document/7322467.

Mohammed Baydoun et al., "Enhanced Parallel Implementation of the K-Means Clustering Algorithm", 2016 3rd International Conference on Advances in Computational Tools for Engineering Applications (ACTEA), Jul. 2016, 5 pgs., https://ieeexplore.ieee.org/document/7560102.

Stephen Choi, et al., "Early Experience with Optimizing I/O Performance using High Performance SSDs for In-Memory Cluster Computing", 2015 IEEE International Conference on Big Data (Big Data), Nov. 2016, 11 pgs., https://ieeexplore.ieee.org/document/7363861.

Wu, Chin-Hsien et al.; An Efficient B-Tree Layer for Flash-Memory Storage Systems, Department of Computer Science and Information Engineering, National Taiwan University, Taipei, Taiwan, 2003, 20 pages.

* cited by examiner

PARALLEL KEY VALUE BASED MULTITHREAD MACHINE LEARNING LEVERAGING KV-SSDS

CROSS-REFERENCE TO RELATED APPLICATION(S)

This application claims the benefit of U.S. Provisional Patent Application No. 62/863,558 filed Jun. 19, 2019, and titled PARALLEL KEY VALUE BASED MULTI-THREAD MACHINE LEARNING EXPLOITING KV-SSDS, and claims the benefit of U.S. Provisional Patent Application No. 62/790,705 filed Jan. 10, 2019, and titled PARALLEL KEY VALUE BASED MULTI-THREAD MACHINE LEARNING EXPLOITING KV-SSDS, the entire content of each of the above-listed applications is incorporated herein by reference.

BACKGROUND

Key value solid-state drives ("KV-SSDs") can be used as storage devices to increase the speed of key-value stores for applications (e.g., RocksDB) that natively support key-value based operation. Some high performance computing ("HPC") and machine learning ("ML") applications that are used are file based by default, rather than being designed for key-value operation. Many HPC and ML applications utilize multithreading, for example, multithreading as supported by the use of the OpenMP multithreading platform. These applications may rely upon the file system and block layers of the operating system to maintain memory mappings and thread safety. Therefore, it may be desirable to have an application programming interface ("API") that can port the file-based operation of HPC and ML applications to key-value based operation while leveraging the potential speed increase offered by the use of KV-SSDs. Moreover, it may be advantageous to not only implement the speed increase offered by the use of a KV-SSD, but to also take advantage of the availability for data retrieval and storage parallelism that can be achieved using a SSD, such as a KV-SSD.

SUMMARY

The present disclosure relates to key value storage systems (e.g., KV-SSDs) implemented within an HPC and/or ML system. More specifically, the present disclosure relates to a key value based storage infrastructure for parallel computing. This infrastructure simplifies application data management by removing intermediate layers from the input/output stack of an operating system's kernel. Additionally, according to some embodiments, parallel data threads may be implemented concurrently with parallel computing threads as enabled by modified multithreading platform compiler directives, such as modified OpenMP #pragmas. This may permit fine-grain control of parallel computing, and of parallel access to data in persistent storage, which may result in improved resource utilization.

A key-value based system for parallel computing includes: a key value solid state drive; and, a processing circuit. The processing circuit being configured: to run a multithreaded application; to run a key value parallel computing system; and to operate a plurality of data threads in parallel with the multithreaded application. The data threads being capable of performing parallel key-value input operations and output operations with the key value solid state drive, each data thread being associated with at least one compute thread of the multithreaded application. The key value parallel computing system including: a multithreading platform, a multithreaded kernel device driver, and a key value concurrency manager, the key value concurrency manager being configured to manage thread-safe asynchronous key-value input operations and output operations with the key value solid state drive.

The key-value based system for parallel may be embodied wherein the key value concurrency manager is further configured to manage a plurality of user queues, each user queue having an associated user queue ID.

The key-value based system for parallel computing may be embodied wherein the running of the multithreaded application includes: converting a file based multithread workload into a key-value based multithread workload; creating a first value for a first file data chunk; creating a first key for the first value; generating a first metadata that associates the first key with the first value and that maps the first key back to a first file; and generating a second metadata that associates the first key with a first thread ID and a first user queue ID.

The key-value based system for parallel computing may be embodied wherein converting a file based multithread workload into a key-value based multithread workload includes partitioning the first file into at least a data chunk, the data chunk being sized according to the allowable value size parameter of the key value solid state drive.

The key-value based system for parallel computing may be embodied wherein one of the plurality of data threads is configured to handle input output operations for a plurality of compute threads.

The key-value based system for parallel computing may be embodied wherein each of the plurality of data threads has an associated thread ID.

The key-value based system for parallel computing may be embodied wherein the thread-safe asynchronous key-value input operations and output operations with the key value solid state drive are performed using a coherency management protocol.

The key-value based system for parallel computing may be embodied wherein the coherency management protocol is a modified owned exclusive shared invalid ("MOESI") protocol.

A key-value based system for parallel computing, includes: an application program interface ("API"); a concurrency manager; and a kernel device driver, the application program interface being configured to: receive a file; partition the file into at least one data chunk; assign a key to the at least one data chunk; and create a first metadata table associating the key to the received file; the concurrency manager being configured to: associate, within a second metadata table, the key corresponding to the at least one data chunk with a first data thread ID and with a submission queue ID; monitor the first data thread ID and the submission queue ID to track the status of a read or write operation being carried out using the key; and update the second metadata table based upon completion of the read or write operation being carried out using the key; and the kernel device driver being configured to carry out key value stores and retrievals in parallel on a key value solid state drive.

The key-value based system for parallel computing may be embodied wherein the file is stored in a block solid state drive.

The key-value based system for parallel computing may be embodied wherein the file is stored in the key value solid state drive.

The key-value based system for parallel computing may be embodied wherein the partitioning of the file into at least a data chunk includes: calculating the size of the file; and partitioning the file up into at least one data chunk having a size determined by the size and alignment specifications of the key value solid state drive.

The key-value based system for parallel computing may be embodied wherein the kernel device driver is further configured to carry out read and write operations to the key value solid state drive using a plurality of data threads, each data thread having a thread ID and a user queue ID.

The key-value based system for parallel computing may be embodied wherein the data threads are operated in parallel with a plurality of compute threads.

The key-value based system for parallel computing may be embodied wherein the read and write operations are carried out asynchronously by the data threads.

A method for operating a parallelized application, includes: receiving, by a processing circuit, instructions to process a file stored on a first storage device; retrieving, by the processing circuit, the file from the first storage device; partitioning, by the processing circuit, the file up into a plurality of data chunks; assigning, by the processing circuit, a key for each of the plurality of data chunks; storing; by the processing circuit, the keys and associated data chunks to a key value solid state drive using at least two parallel data threads; and retrieving, by the processing circuit, keys and associated data chunks from the key value solid state drive using at least two parallel data threads.

The method may further include generating, by the processing circuit, a first metadata table linking the keys to the corresponding data chunks.

The method may further include generating, by the processing circuit, a second metadata table linking the keys to a data thread, using a thread ID associated with the thread, and to a user queue, using a user queue ID associated with the user queue.

The method may further include managing, by the processing circuit, a task associated with at least one of the keys allocated to at least one of the data threads by enforcing that the task is completed by the data thread before another task is performed by the same thread.

The method may further include operating, by the processing circuit, a plurality of compute threads in parallel with at least two data threads.

DETAILED DESCRIPTION

Figure 1:
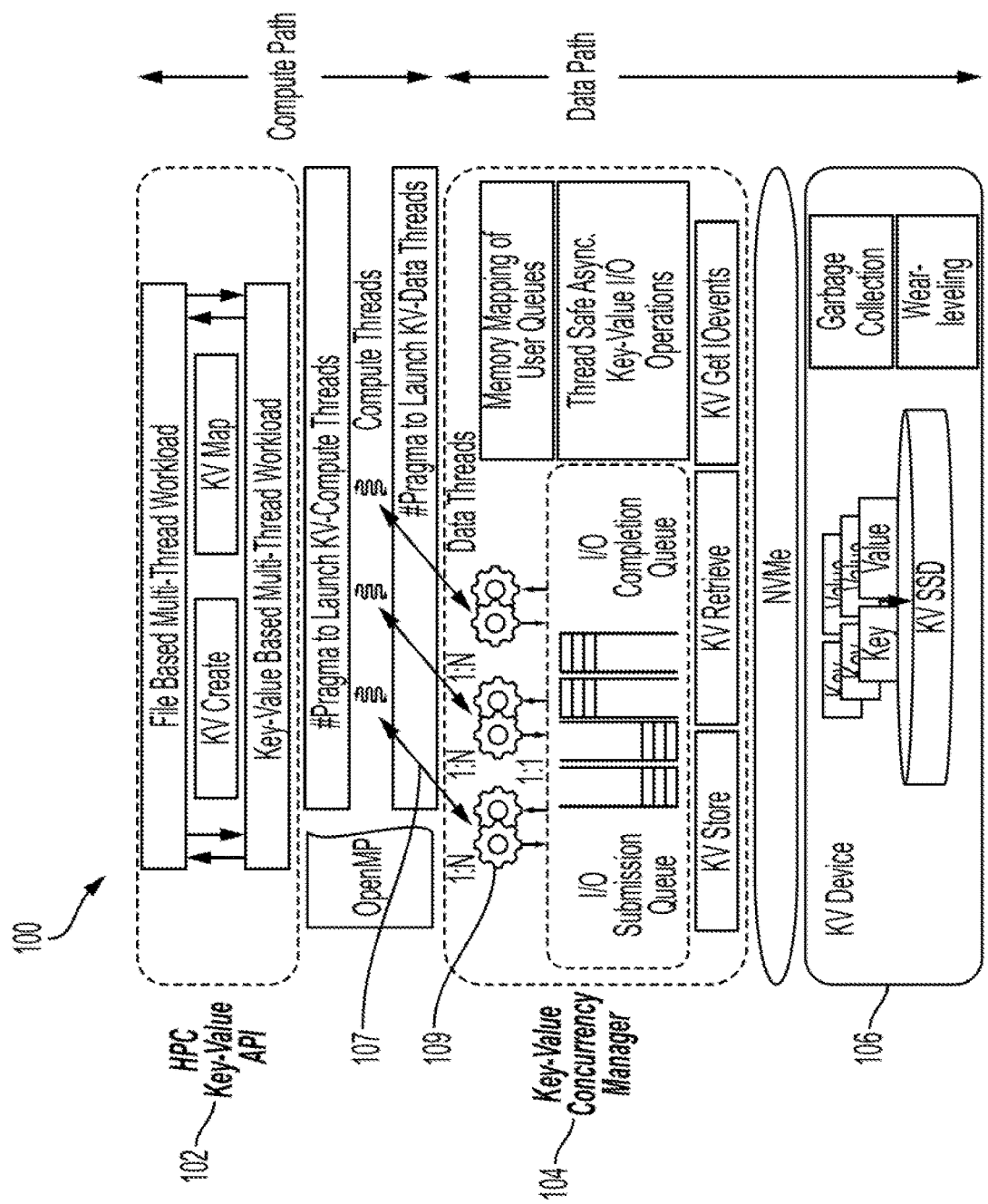
FIG. 1 is a depiction of a key value based storage infrastructure for parallel computing illustrating an HPC key-value API and a key-value concurrency manager, according to some embodiments of the present disclosure.

Features of the inventive concept and methods of accomplishing the same may be understood more readily by reference to the following detailed description of embodiments and the accompanying drawings. Hereinafter, embodiments will be described in more detail with reference to the accompanying drawings. The described embodiments, however, may be embodied in various different forms, and should not be construed as being limited to only the illustrated embodiments herein. Rather, these embodiments are provided as examples so that this disclosure will be thorough and complete, and will fully convey the aspects and features of the present inventive concept to those skilled in the art. Accordingly, processes, elements, and techniques that are not necessary to those having ordinary skill in the art for a complete understanding of the aspects and features of the present inventive concept may not be described. Unless otherwise noted, like reference numerals denote like elements throughout the attached drawings and the written description, and thus, descriptions thereof will not be repeated. Further, parts not related to the description of the embodiments might not be shown to make the description clear. In the drawings, the relative sizes of elements, layers, and regions may be exaggerated for clarity.

In the following description, for the purposes of explanation, numerous specific details are set forth to provide a thorough understanding of various embodiments. It is apparent, however, that various embodiments may be practiced without these specific details or with one or more equivalent arrangements. In other instances, well-known structures and devices are shown in block diagram form in order to avoid unnecessarily obscuring various embodiments.

It will be understood that, although the terms "first," "second," "third," etc., may be used herein to describe various elements, components, regions, layers and/or sections, these elements, components, regions, layers and/or sections should not be limited by these terms. These terms are used to distinguish one element, component, region, layer or section from another element, component, region, layer or section. Thus, a first element, component, region, layer or section described below could be termed a second element, component, region, layer or section, without departing from the spirit and scope of the present invention.

It will be understood that when an element, layer, region, or component is referred to as being "on," "connected to," or "coupled to" another element, layer, region, or component, it can be directly on, connected to, or coupled to the other element, layer, region, or component, or one or more intervening elements, layers, regions, or components may be present. However, "directly connected/directly coupled" refers to one component directly connecting or coupling another component without an intermediate component. Meanwhile, other expressions describing relationships between components such as "between," "immediately between" or "adjacent to" and "directly adjacent to" may be construed similarly. In addition, it will also be understood that when an element or layer is referred to as being "between" two elements or layers, it can be the only element or layer between the two elements or layers, or one or more intervening elements or layers may also be present.

The terminology used herein is for the purpose of describing particular embodiments only and is not intended to be limiting of the present disclosure. As used herein, the singular forms "a" and "an" are intended to include the plural forms as well, unless the context clearly indicates otherwise. It will be further understood that the terms "comprises," "comprising," "have," "having," "includes," and "including," when used in this specification, specify the presence of the stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

As used herein, the term "substantially," "about," "approximately," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value. Further, the use of "may" when describing embodiments of the present disclosure refers to "one or more embodiments of the present disclosure." As used herein, the terms "use," "using," and "used" may be considered synonymous with the terms "utilize," "utilizing," and "utilized," respectively. Also, the term "exemplary" is intended to refer to an example or illustration.

When a certain embodiment may be implemented differently, a specific process order may be performed differently from the described order. For example, two consecutively described processes may be performed substantially at the same time or performed in an order opposite to the described order.

The term "processing circuit" is used herein to mean any combination of hardware, firmware, and software, employed to process data or digital signals. Processing circuit hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs). In a processing circuit, as used herein, each function is performed either by hardware configured, i.e., hard-wired, to perform that function, or by more general purpose hardware, such as a CPU, configured to execute instructions stored in a non-transitory storage medium. A processing circuit may be fabricated on a single printed circuit board (PCB) or distributed over several interconnected PCBs. A processing circuit may contain other processing circuits; for example a processing circuit may include two processing circuits, an FPGA and a CPU, interconnected on a PCB.

The electronic or electric devices and/or any other relevant devices or components according to embodiments of the present disclosure described herein may be implemented utilizing any suitable hardware, firmware (e.g. an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. Further, the various components of these devices may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device, or the functionality of a particular computing device may be distributed across one or more other computing devices without departing from the spirit and scope of the embodiments of the present disclosure.

Unless otherwise defined, all terms (including technical and scientific terms) used herein have the same meaning as commonly understood by one of ordinary skill in the art to which the present inventive concept belongs. It will be further understood that terms, such as those defined in commonly used dictionaries, should be interpreted as having a meaning that is consistent with their meaning in the context of the relevant art and/or the present specification, and should not be interpreted in an idealized or overly formal sense, unless expressly so defined herein.

Described herein is an system for key-value based parallel computing leveraging KV-SSDs. The system may use a series of software components that enable the use of a key-value based persistent storage device (i.e., a KV-SSD) while adding additional software instructions to allow for parallel data accesses to the KV-SSD alongside parallelized computing threads. These parallel data accesses are carried out by what are referred to herein as "data threads". These data threads are managed within an infrastructure maintained by a key-value concurrency manager that associates keys and values with IDs maintained for each data thread and with input/output queue IDs. As will be described below, these thread IDs and queue IDs are maintained by the concurrency manager in order to ensure that the parallel data threads operate in a thread-safe manner. Such a system may provide better resource utilization and increased overall processing performance when dealing with large volumes of data as is common with high performance computing or machine learning applications. The exemplary embodiments described herein are for illustrative purpose only, and are not intended to be limiting of the scope of the present disclosure.

As depicted in FIG. 1, some aspects of embodiments relate to a key-value based storage infrastructure for parallel computing 100. This infrastructure 100 may include an application programing interface ("API") 102 for converting a file based parallel processing system to a key-value based parallel processing system. This parallelized processing is accomplished through the use of a multithreaded user application. Such an application may be built using a multithreading platform that allows for a user to more easily create parallelized code. OpenMP is an example of a multithreading platform for creating multithreaded parallel processing applications. It will be understood by one skilled in the art that alternative platforms to OpenMP, such as POSIX Threads, may be used within the scope of the present disclosure. For ease of reference, the following disclosure will primarily describe embodiments using the OpenMP platform. Within OpenMP exist compiling directives known as #pragmas that can be used to create parallelized execution of code. The infrastructure 100 may also include a modified set of compiler directives, such as modified OpenMP #pragmas, that enable the use of parallel data threads 107 concurrently with the use of parallel compute threads. These modified compiler directives allow for asynchronous parallel retrievals of data from the KV-SSD 106 to the memory and storages of data from the memory to the KV-SSD 106. As used herein, term "asynchronous" is used to indicate that a data thread may be released once it has moved the data it is operating on into a queue for writing to persistent storage, rather than waiting for confirmation that the data has successfully been moved from the system memory to the storage (i.e., the KV-SSD 106).

Additionally, the infrastructure may include a process running within the operating system, hereinafter referred to as a concurrency manager 104 module, for managing memory mapping and thread safety while the system operates using a KV-SSD 106. The concurrency manager 104 may be an infrastructure to maintain memory mapping and thread-safety when running a multithreaded application while using a KV-SSD 106. The concurrency manager 104 may include input/output ("I/O") submission and completion queues 109 that are managed by the host system. Along with the submission and completion queues 109, the concurrency manager 104 may implement a series of functions that add read or store requests to the submission queues. Additional functions may be implemented that allow for tracking of the completion of the queued requests, using the completion queues, and associating the requests with the queue ID and thread ID for the corresponding data thread.

More specifically, the functions "KV Store" and "KV Retrieve" may be implemented by the concurrency manager 104 to manage data flow from the host memory to the KV-SSD 106 and vice versa. KV Store may append key-value pairs to the submission queue for a thread for a write/update to the KV-SSD 106. KV Retrieve will find and return a key-value pair to a specified portion of the host memory buffer. The operations of memory buffer allocation need to be explicitly handled at the user layer (i.e., programmed into the multithreaded application by a user). The memory buffer allocation for the stream of data for KV Store and KV Retrieve will be done considering the submission queue depth and the number of parallel data threads for each queue. For example, for the structure "kv_data" which contains key_buf and val_buf, the following command reserves the required memory: cmd_data=valloc(sizeof (struct kv_data)*qdepth*iothread).

The concurrency manager 104 also implements counters to track the number of I/Os issued, the number of I/Os that are queued, and the number of I/Os completed by each data thread and submission queue to ensure thread-safety of the asynchronous I/Os. These counters and the corresponding submission and completion queues 109 may be updated if there are any completed asynchronous I/Os. During runtime, the number of completed I/Os by each thread will be instrumented by calling the function "KV Get IOevent" within the same thread that issued the I/O. Specifically, a bitmap will be maintained to log the mapping of the key to thread ID and submission queue ID for all data. Thus, when a batch of I/O requests enter the submission queues, this bitmap will be updated, and the counters maintaining the vacancy of those submission queues will be decreased. Upon polling of the completion queues, the KV Retrieve function will use the bitmap to identify the submission queue ID and the thread ID that the completed request belongs to and then increase the vacancy of the corresponding completion queues. The retrieved data may then be passed on to the processing circuit for further computing. New I/O requests may enter the respective submission and completion queues 109 depending on their vacancies. The maximum number of I/Os that can be submitted to a submission queue at the same time will be equal to the queue depth times the number of parallel data threads associated with that submission queue.

As mentioned above, some embodiments of the present invention are related to a HPC key-value API 102 to convert a file-based application to a key-value based application. This conversion is depicted in FIG. 1 as being carried out by the HPC key-value API 102. This enables the HPC system to leverage the speed increase associated with the use of a KV-SSD 106. Some embodiments may include both a block SSD (not depicted) and a KV-SSD 106, with such a configuration being referred to herein as a "hybrid" system.

Figure 4:
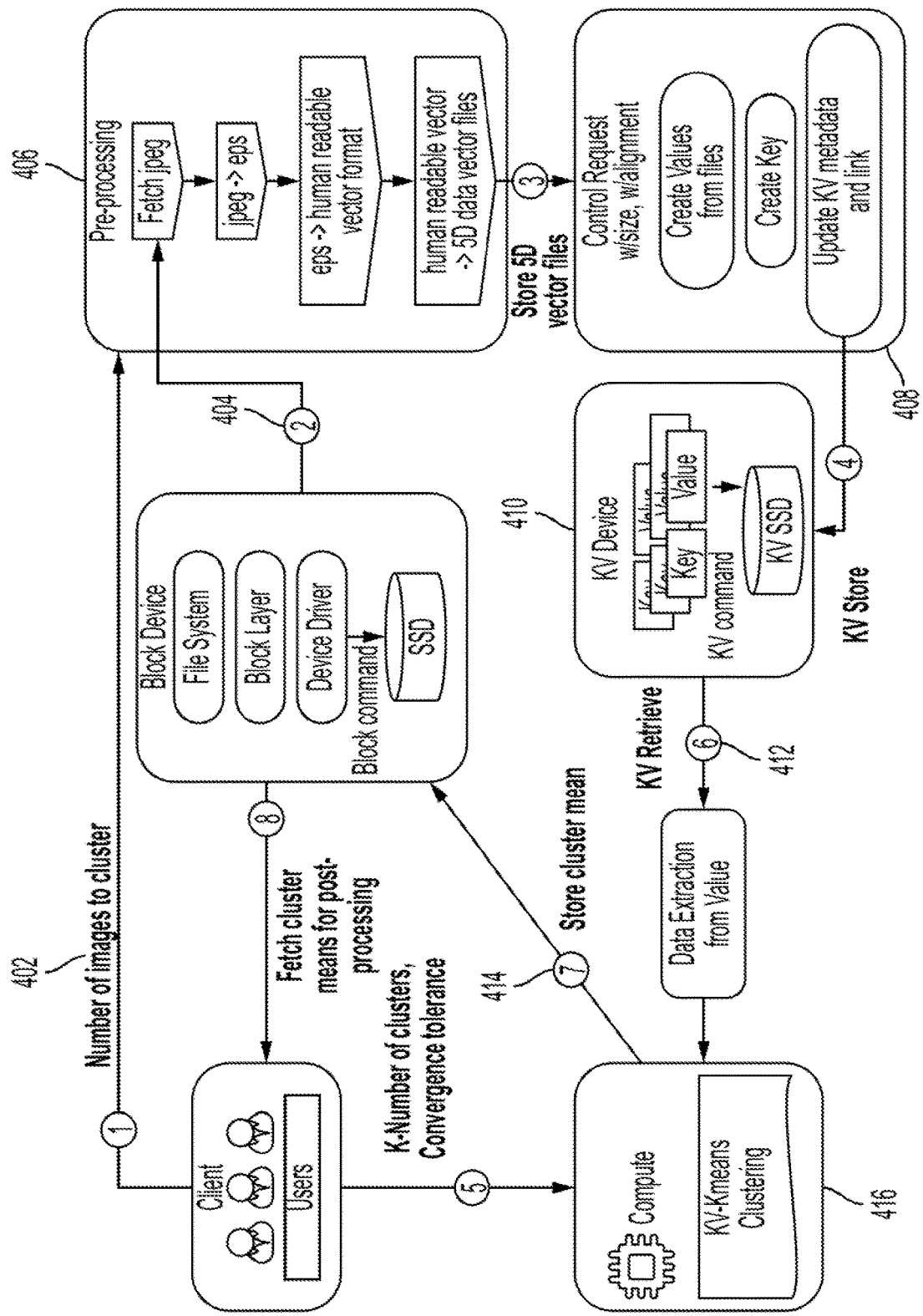
FIG. 4 is a depiction of an exemplary process for using the key-value based parallel computing infrastructure, according to an embodiment of the present disclosure.

Within the context of a hybrid system, operation of the HPC key-value API 102, can be better understood by turning to the exemplary process implementing an embodiment of the parallel computing infrastructure depicted in FIG. 4. When using a hybrid system, a user may select a collection of data (e.g., images stored in jpeg files) to be processed by a HPC or ML application (Step 402), and that data may be stored on a block device (e.g., a block SSD). The selected files are then retrieved from the block device (Step 404). The selected files may go through a pre-processing step (Step 406), in which, for example, jpeg files may be converted into encapsulated postscript ("EPS") which can then be converted into a human-readable vector format. The human-readable vector format files can then be converted (e.g., using python) into files containing "frame 5 dimension data" (i.e., 5-dimensional vector data). Each such file includes a set of five-dimensional vectors, each representing one pixel of the image, each five-dimensional vector having three components specifying the red, green, and blue values of the pixel and two components specifying the X and Y coordinates of the pixel. This type of vector file can be processed by a HPC application or ML application, such as, for example, a K-means clustering algorithm. It will be understood by those skilled in the art that any suitable type of pre-processing for the files may be utilized to ensure that the data is in a usable format for a desired application. In some embodiments, the data may be stored on the block SSD without the need for pre-processing, in which case the pre-processing step may be omitted. In other embodiments, the unprocessed data may be stored on the KV-SSD 106.

In other embodiments, the block SSD may be omitted from the system, with the unprocessed files being stored on the KV-SSD 106. In such an embodiment, those storage and retrieval functions that, in a hybrid system, may be associated with the block SSD of the hybrid system can be performed by the KV-SSD 106.

Once the data is in a usable format, the HPC key-value API 102 can convert the file based workload, which can include the requested files for processing, into a key-value based workload (Step 408). The HPC key-value API 102 may be integrated into a multithreaded application by incorporating the calls to a pair of functions referred to as the "KV Create" and "KV Map" functions. The key-value data can then be stored on the KV-SSD (Step 410) using an operation referred to herein as "KV Store". Once stored on the KV-SSD, the data can then be retrieved for processing using an operation referred to herein as "KV Retrieve" (Step 412). Processing of the data can then be performed (step 416), for example using a K-means clustering algorithm, and the processed data can then be stored back to the block device or to the KV-SSD (Step 414).

Figure 2:
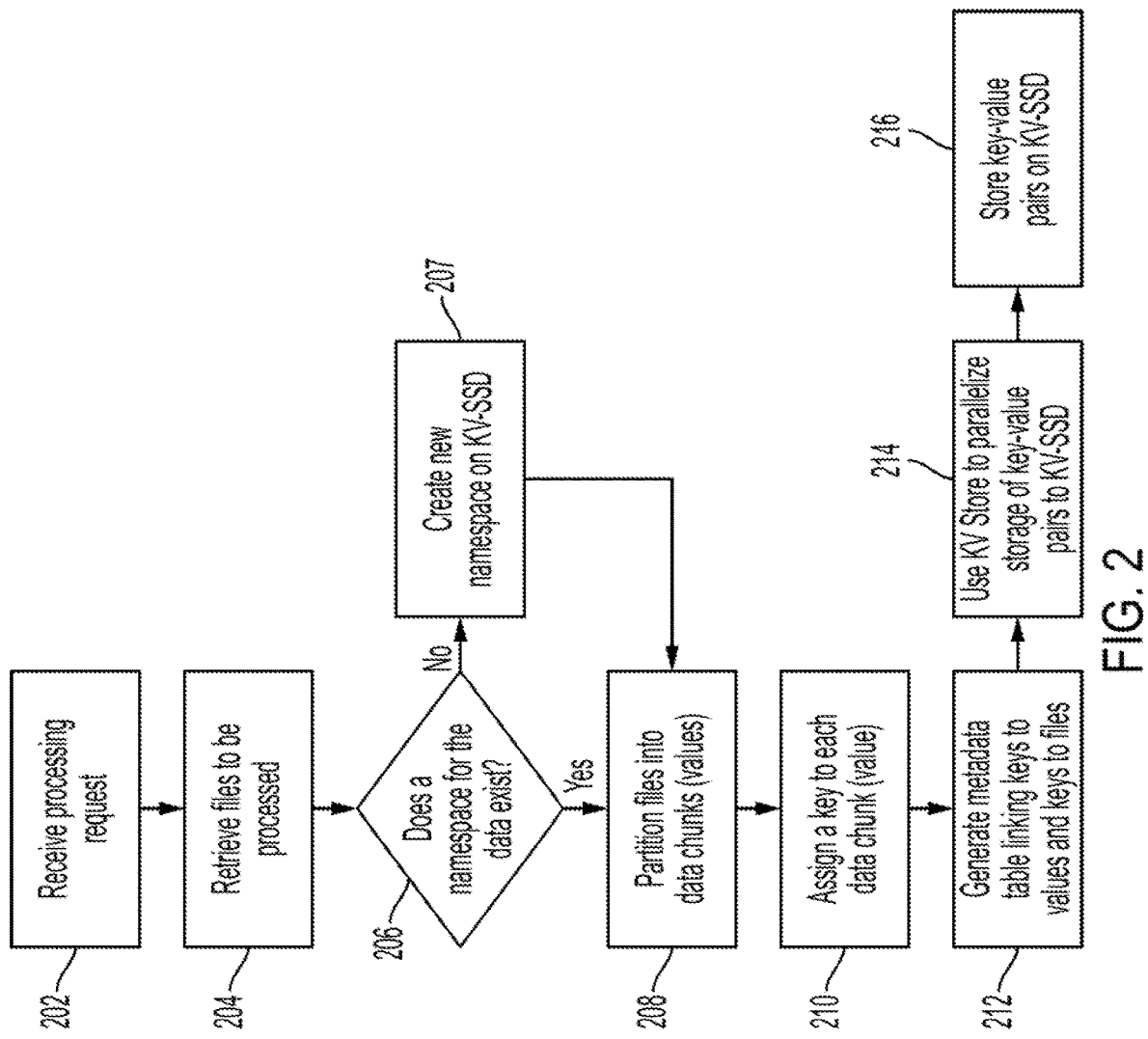
FIG. 2 is a flowchart representing example operational steps of the KV Create function, according to some embodiments of the present disclosure.

The function of converting requested files into values that can be associated with keys is referred to above as "KV Create", and is depicted in the flowchart of FIG. 2. This function is accomplished by receiving (at 202) a processing request and retrieving (204) the requested files. The process then proceeds to the step of determining (206) whether a namespace already exists for the type of data to be written to the KV-SSD, since each namespace corresponds to a type of data. If the data to be stored on the KV-SSD 106 already has an associated namespace on the KV-SSD 106, then the step of namespace creation can be omitted. If a namespace associated with the data type does not yet exist, the HPC key-value API 102 creates (207) a namespace on the KV-SSD 106 for the data. For example, if the five-dimensional vector data corresponding to pixels within a jpeg image, as discussed above, is to be stored, then a namespace corresponding to that type of data would be created. If cluster data, as created for example by a K-means clustering algorithm that has processed a collection of frame 5 dimension data, is to be stored, then an additional namespace can be created to maintain a distinction between the types of data being stored on the KV-SSD 106.

The data from an individual file can then be converted to one or more values to be stored on the KV-SSD 106 based upon the size and alignment specifications of the KV-SSD 106. This step comprises partitioning (208) a file, which may have a large file size, into chunks based upon the value size parameters of the KV-SSD 106. Each of the data chunks can then be treated as a value. A key is created for each new value, and each key is assigned (210) to a value. This assignment of the keys to the corresponding values is stored in a first metadata table. This operation is hereinafter referred to as "KV Map." As will be discussed in more detail below, a second metadata table is also created (212) by the KV Map function that further associates each key with a corresponding thread ID and a queue ID to facilitate the parallelized storage of the key-value pairs to the KV-SSD. The paired keys and values can then be stored (214), using the KV Store function, on the KV-SSD 106 using the namespace. The key-value data is then stored (216) on the persistent storage device (i.e., the KV-SSD).

As a non-limiting example, C++ code of Listing 1 below is an example of a portion of a user application that further illustrates the processes undertaken by KV Create and KV Map. After the KV Create and KV Map functions have been called, the C++ code of Listing 1 sets the operation type using the "opcode" parameter to "retrieve" in order to fetch the data stored in the array "a". Next, the required memory for fetching the data stored at a particular index of the array "a" is allocated. Finally, the square is computed. The example C++ code of Listing 1 illustrates the use of #pragmas to instruct the compiler, at lines 11 and 12, to create parallel compute threads and parallel data threads to execute (in parallel) the operations in the for loop.

Listing 1

```
1   char data = "application_data";
2   kvcreate(*namespace, key_len, data_len, *key_addr, *data_addr, data, cmd_type);
3   kvmap(*map, *namespace, data, *keyid, *key_addr);
4   int* num_points;
5   cmd_ctx[keyid[num_points]].cmd.opcode = nvme_cmd_kv_retrieve;
6   num_points = (int*)cmd_ctx[keyid[num_points]].cmd.data_addr;
7   int thread_no, init_thread_no = 2, max_thread_no = omp_get_max_threads( );
8   omp_set_num_threads(thread_no);
9   square=(int*)malloc(sizeof(int)*num_points);
10  a=(int*)malloc(sizeof(int)*num_points);
11  #pragma omp parallel default(shared)
12  #pragma omp for
13  for (iter=1; iter<=num_points; iter++)
14  {
15      cmd_ctx[keyid[a[iter]]].cmd.opcode = nvme_cmd_kv_retrieve;
16      a[iter] = (int*)cmd_ctx[keyid[a[iter]]].cmd.data_addr;
17      square[iter] = a[iter]*a[iter];
18  }
19  free(square);
20  square = NULL;
```

In the code of Listing 1, the compiler may, for each iteration of the for loop, assign the data operation of line 16 to a respective data thread, and the compiler may assign the computation of line 17 to a respective compute thread, or each such thread may handle several iterations of the loop. The number of iterations to assign to each thread is determined at runtime. For example, one data thread may handle line 16 for five iterations of the for loop, and one compute thread may handle line 17 for 10 iterations of the for loop.

Figure 3:
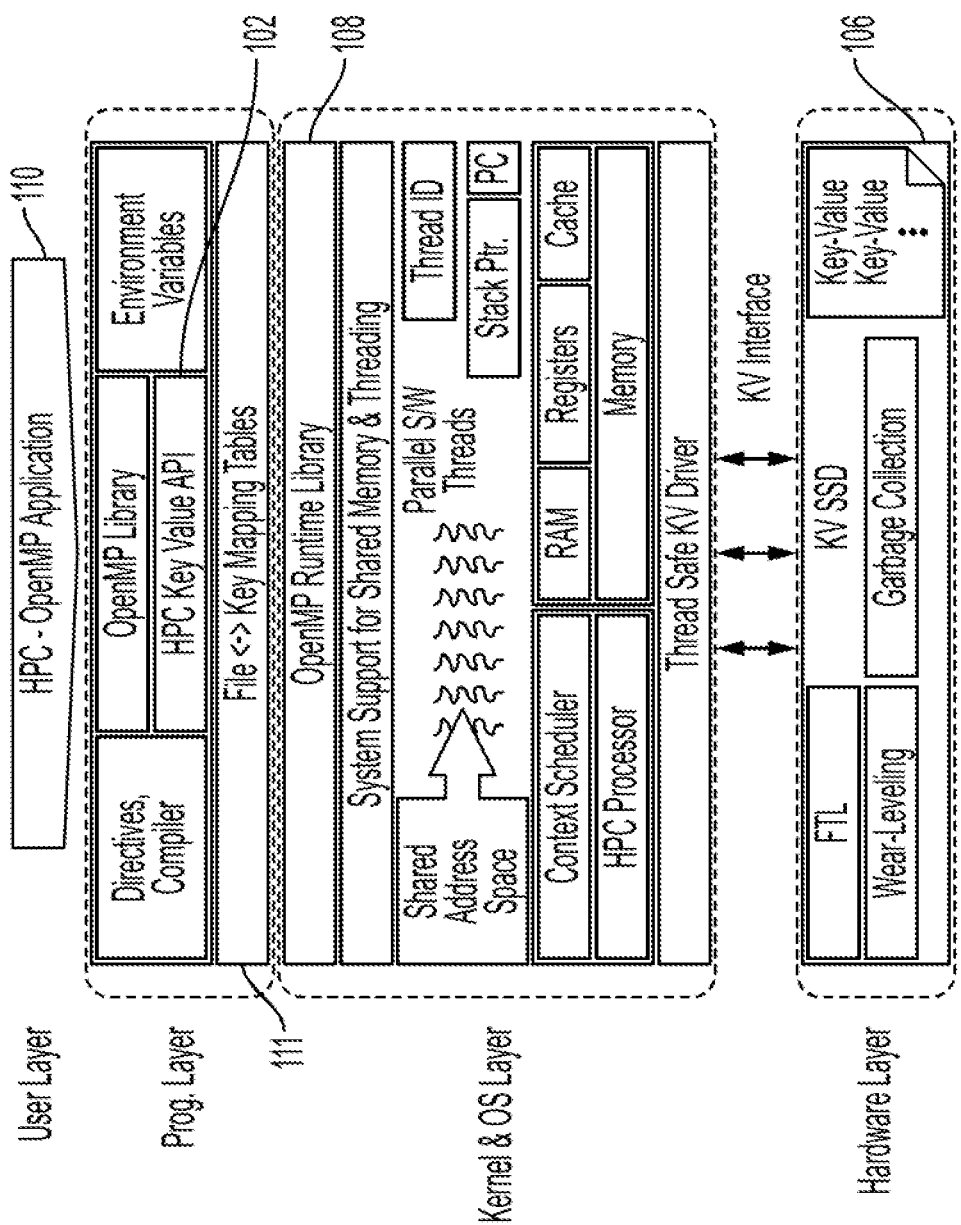
FIG. 3 is a depiction of various layers within the key-value based storage infrastructure for parallel computing, including portions of the system where programming changes take place, according to some embodiments of the present disclosure.
Figure 5:
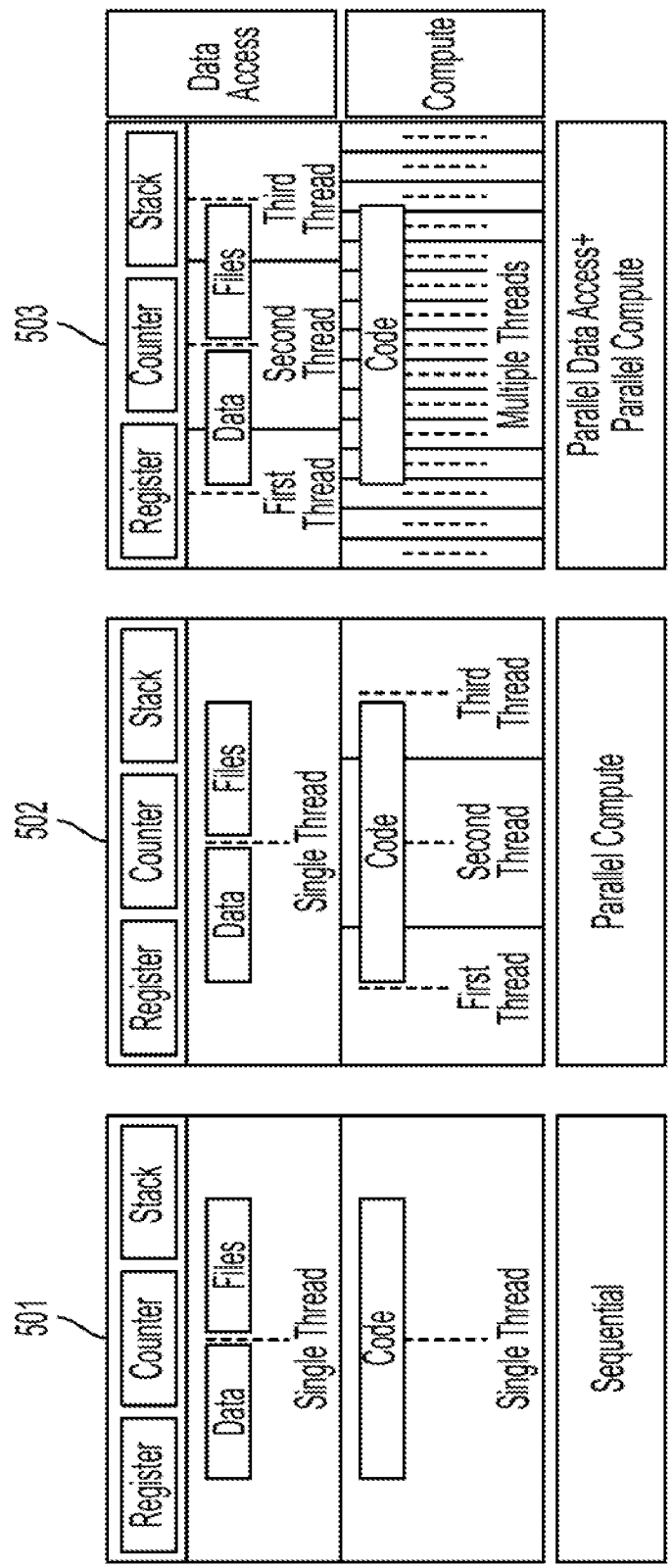
FIG. 5 is a depiction of data thread parallelization, according to some embodiments of the present disclosure.

Turning now to the depiction of the various layers within the infrastructure for parallel computing of FIG. 3, some embodiments are directed to changes to the OpenMP Runtime Library 108 and the operating system ("OS") support for utilization of shared memory space and threading for use with a multithreaded application 110. Some embodiments relate to the modification of a subset of compiler directives, for example OpenMP #pragmas, to enable the use of parallel compute and data threads 107. For example, modifications to the OpenMP #pragmas "omp parallel" and "omp for" are made to incorporate (i) code that enables the creation and recognition of parallel data threads and (ii) error handling code. It will be understood by one skilled in the art that similar modifications may be made to the compiler directives of an alternative multithreading platform, such as POSIX Threads. Examples of such parallel data threads 107 are depicted in FIG. 1 as arrows directed from the compute threads to the I/O submission and completion queues 109. Another exemplary depiction of the parallel data threads can be seen in FIG. 5, which illustrates the operation of (from left to right): a single data thread serving a single compute thread 501; a single data thread serving multiple compute threads 502; and multiple parallel data threads each serving multiple compute threads 503.

For each line of code making up the compiler directives of the multithreading platform that relate to parallelization of compute threads, such as #pragmas within the OpenMP runtime library, an analogous line of code can be inserted to allow for the recognition of and utilization of a data thread. This may allow for the use of the modified compiler directives within the multithreading platform and allow for the creation of parallel data threads. Referring back to the C++ of Listing 1, the use of the modified #pragmas can be visualized according to FIG. 5. Lines 11 and 12 include the #pragmas for parallelizing the execution of the for loop. Without the use of such #pragmas, the code would be executed according to the single thread example as shown in depiction 501 of FIG. 5. In an embodiment in which compiler directives have not been modified to enable the creation of parallel data threads, use of the #pragmas in lines 11 and 12 enables the parallel execution of compute tasks, as shown for example in 502 of FIG. 5. In an embodiment in which the compiler directives have been modified to enable the creation of parallel data threads, use of the #pragmas in lines 11 and 12 enables the parallel execution of compute tasks, and also enables the parallel execution of data tasks (e.g., in respective data threads), as shown for example in 503 of FIG. 5.

Error handling code, which is omitted within in Listing 1 for simplicity, can be introduced to handle (e.g., report) errors that may be introduced by the changes made to the multithreaded application 110 to take advantage of (i) the availability of parallel data threads and (ii) key value based persistent storage. As will be appreciated by those skilled in the art, any suitable error handling methodology for detecting and handling (e.g., reporting) errors may be utilized within the scope of the present invention.

In a system operating only with a block device (e.g., a block SSD), the file system can be used for memory mapping of application data, and, the block layer can be used by the multithreaded parallel application 110 for thread-safe asynchronous input/outputs to the block device. Some embodiments of the present disclosure are, however, directed to the use of a KV-SSD 106 where the file system and block layer are removed. The advantages of such a design will be appreciated by those skilled in the art. The removal of the file system and block layer creates a problem for the use of HPC parallel processing techniques because the use of asynchronous parallel data requests may use the file system and block layer for memory mapping and thread safety. This may create a need for a module that can monitor the status of the asynchronous operations being carried out by the parallel data threads to ensure that the operations are carried out in a thread-safe manner on the persistent storage device (i.e., the KV-SSD 106), including the time after a thread has been released. Therefore, some embodiments are directed towards a key value concurrency manager (104 of FIG. 1) module that replaces the functionality of the file system and block layer for applications (such as the multithreaded application 110 (FIG. 3)) using a multithreading platform in a system utilizing a KV-SSD 106.

The modified compiler directives may also be integrated into the operating system kernel device driver ("KDD") to allow for the creation of parallel data threads that can be run concurrently with the parallel compute threads enabled by OpenMP. This integration allows for parallel read/write tasks to be carried out concurrently with a parallelized compute task. The combination of (i) a multithreading platform (such as OpenMP), (ii) a multithreaded kernel device driver, and (iii) a key-value concurrency manager may be referred to herein as a "key value parallel computing system". During concurrent operation, each of the parallel data threads is associated with one or more compute threads.

Each data thread may have its own input/output ("I/O") submission and completion queue. Turning back now to FIG. 1, these queues are depicted as gears 109 in FIG. 1. An additional representation of a pair of submission and completion queues 109, illustrating the queue depth, is depicted beneath the gears in FIG. 1. These queues serve to order the read/write operations necessary for completing the compute tasks assigned to the compute threads to which the data thread is associated. Each thread can have an associated thread ID. Depending upon queue depth and completion rate, the submission queues for each thread may be refilled with a first in first out ("FIFO") policy.

The number of parallel data threads utilized may, in some embodiments, be specified by the user. In other embodiments, the number of data threads utilized may be automatically assigned by the multithreaded application 110. This automation may take into account bandwidth utilization and CPU performance to adjust the number of data threads to achieve optimal parallelization of the multithreaded application 110. The additional parallelism provided by the parallel data threads can permit a more fine-grained control over the parallelization, in the sense that an optimal level of parallelization for a particular operation may be found by adding in the additional functionality provided for by the parallel data threads. This additional control over the parallelization may, in some embodiments, result in improved system resource utilization and improved CPU and memory pipelining.

As depicted in FIG. 1, in some embodiments, the key-value concurrency manager 104 uses the "KV Store," "KV Retrieve," and "KV Get IOevents" functions to replace the functionality of the file system and block layer as relied upon by the multithreaded application 110 (FIG. 3). The KV Store operation allows for the key-value data to be stored on the KV-SSD using parallel data threads, with each thread having a submission and completion queue, the submission queue storing a plurality of write commands for key-value pairs, and the completion queue storing a plurality of command completions for completed commands. In an NVMe system, NVMe 10 queues may be present in addition to the submission and completion queues instantiated by the data threads. The submission and completion queues instantiated by the data threads can be managed by the concurrency manager 104, which is a process running on the host system (e.g., on a processing circuit of the host system) to ensure thread safe operation and memory mapping.

The memory mapping functionality can be better understood by returning to the depiction of the various layers of the parallel computing infrastructure depicted in FIG. 3. The memory mapping, which tracks which files have been converted into key-valued data and stored to the KV-SSD, is accomplished through a second metadata table, represented, along with the first metadata table, in FIG. 3 as the "File↔Key Mapping Tables" 111. This second metadata table associates each key with the file from which its value was extracted and a thread ID and a queue ID. This memory mapping functionality can allow for the tracking of which files have been converted and stored, in an asynchronous parallel fashion, on the KV-SSD 106 for processing. Additionally, the metadata table allows for active monitoring of which keys are being sent using each data thread, and for monitoring each data thread's associated I/O submission and completion queues 109. For example, in an embodiment where there are two data threads that may issue different read requests to the KV-SSD, without the concurrency manager 104 the multithreading platform (e.g., OpenMP) does not have a way to figure out if the completed read is a response from the first thread or the second thread. Thus, an incorrect value may be returned that may cause the user application to crash upon further execution.

The KV Retrieve operation allows for the data threads to make read requests to the KV-SSD 106 in parallel. This parallelization of the read operations being performed on the KV-SSD allows the system to make use of the multiple flash channels available on a modern SSD, such as a KV-SSD 106. KV Retrieve operations may be placed into the same data thread submission queues as KV Store operations, and can be processed in parallel with KV Store operations being carried out across the multitude of data threads.

Coherency of data in the persistent storage (e.g., the KV-SSD) may be maintained during the operation of the parallel data threads by the concurrency manager 104 based on the modified owned exclusive shared invalid ("MOESI") protocol, which is, in other applications, used to ensure cache coherency in a system with a main memory and a plurality of caches. It will be appreciated by those skilled in the art that any other suitable coherency protocol, such as MOSI of MOSIF, may be utilized within the scope of the present invention. Conditional variables may be utilized by the coding of the concurrency manager such as, but not limited to, <pthread_mutex_lock>, <pthread_cond_wait>, and <pthread_mutex_unlock> to control the access of the individual data threads to areas of the shared memory space in implementing the MOESI protocol. For example, the submission queues of the data threads may be analogous to caches, and the persistent memory of the KV-SSD may be analogous to a main memory. The granularity at which the MOESI protocol is applied may be the individual values stored in the KV-SSD 106. As such, a state from among the five available states (modified, owned, exclusive, shared, and invalid) may be assigned to each value in any submission queue, and the MOESI protocol may be employed to determine, for example, whether any particular thread may modify (i.e., write to persistent storage) any of the values in its queue.

The KV Get IOevents operation can be used, in some embodiments, to obtain the current status of the submission and completion queues associated with the data threads. Both the I/O submission and completion queues 109 for each data thread can be monitored using this operation. The KV Get IOevents operation may be used for the tracking of which files have been processed and stored to the KV-SSD 106. This ability to track tracking of which files have been processed and stored to the KV-SSD 106 may make it possible for the processes carried out by the infrastructure 100 to be transparent to a user making use of the OpenMP based multithreaded application 110. In some embodiments, a user may need only to know how many parallel data threads to have generated by the modified compiler directives. In other embodiments, where the number of parallel data threads is automatically assigned, the user may make use of the multithreaded parallel application without any knowledge regarding the functioning of the KV-SSD parallel computing infrastructure.

The infrastructure 100 thus, in use, provides for the utilization of parallel data threads to enable more fine-grained parallelization of a multithreaded application 110 while also providing the necessary monitoring components to allow for thread safe use of the parallel threads in conjunction with a KV-SSD 106. An HPC key value API 102 is provided to port the file based operation of the multi-threaded application 110 to the use of key-values. This provides a speed increase that is further leveraged by the enablement of additional parallelism of the multithreaded application 110 through the modification of compiler directives, such as OpenMP #pragmas, and the inclusion of a concurrency manager 104 module.

Figure 6:
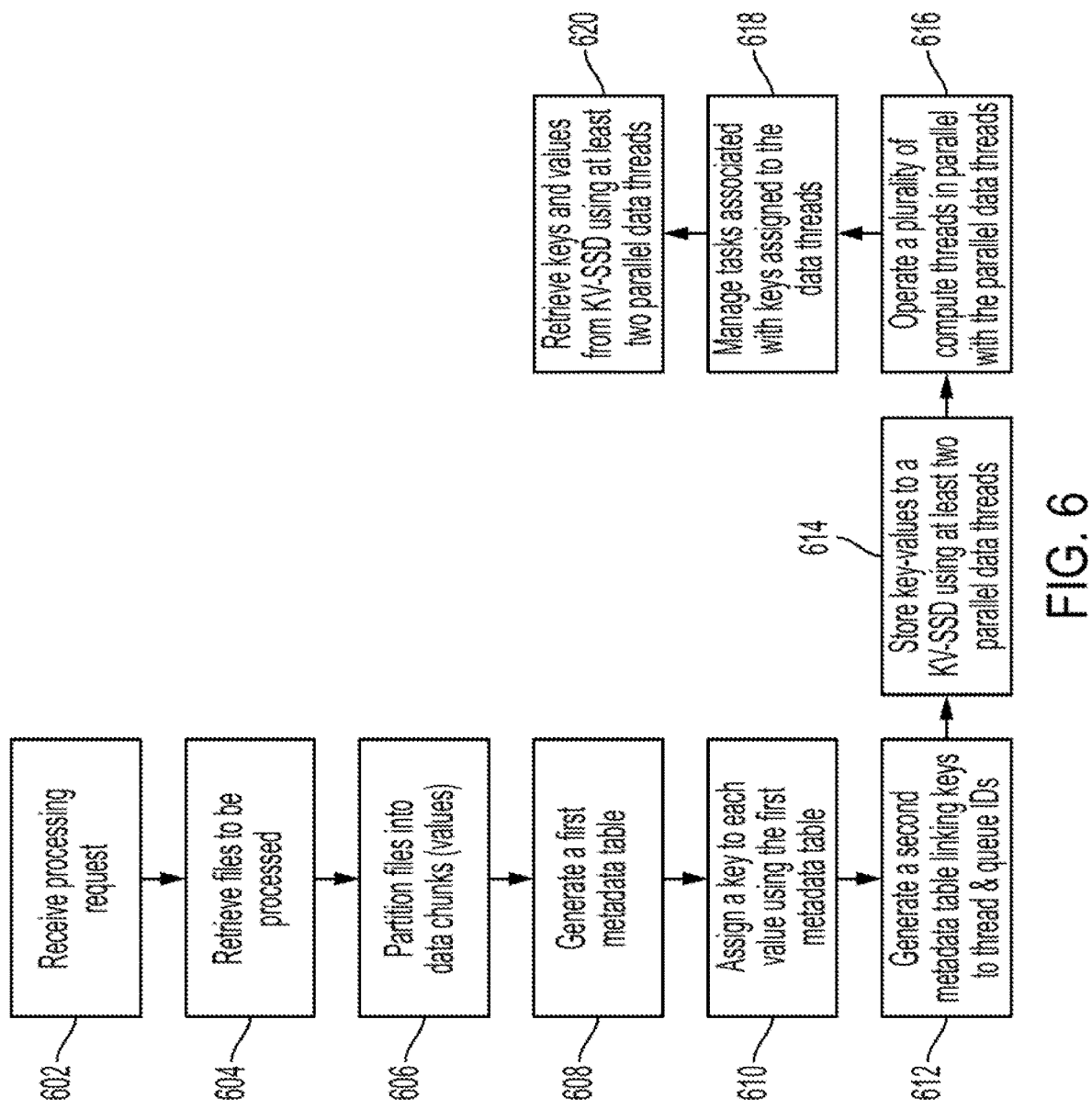
FIG. 6 is a flowchart representing example operational steps of a method for operating a parallel computing system leveraging a KV-SSD, according to some embodiments of the present disclosure.

Use of the infrastructure 100 can be further understood within the context of FIG. 6. First, a processing request is received by the processing circuit (Step 602). Such a request may be initiated by a user of a multithread application 110, such as an application built using the OpenMP platform. Following the request, files, that in some embodiments are stored on a block device, are retrieved (Step 604). Using the KV Create function, the retrieved files are then partitioned into data chunks (i.e., values) (Step 606). Each key is then assigned a value within a first metadata table (Step 608). Additionally, a second metadata table linking keys to thread IDs and queue IDs is generated (Step 612). The key-value pairs may then be stored to a KV-SSD 106 using at least two parallel data threads 107 (Step 614). This may include the operation of a plurality of compute threads in parallel with the parallel data threads 107 (Step 616). Tasks carried out by the parallel data threads can be managed by the concurrency manager 104 (Step 618). After being stored on the KV-SSD 106, key-value pairs can be retrieved from the KV-SSD 106 using at least two parallel data threads 107 (Step 620). This may allow for fine-grained control of the parallelization of the multithread application 110 while leveraging the speed increase associated with the use of a KV-SSD 106.

What is claimed is:

1. A key-value based system for parallel computing, comprising:
    a key value solid state drive; and
    a processing circuit,
    the processing circuit being configured:
        to run a multithreaded application;
        to run a key value parallel computing system; and
        to operate a plurality of data threads in parallel with the multithreaded application,
    the data threads being capable of performing parallel key-value input operations and output operations with the key value solid state drive,
    each data thread being associated with at least one compute thread of the multithreaded application,
    the key value parallel computing system including:
        a multithreading platform,
        a multithreaded kernel device driver, and
        a key value concurrency manager,
    the key value concurrency manager being configured to manage thread-safe asynchronous key-value input operations and output operations with the key value solid state drive.

2. The key-value based system for parallel computing of claim 1, wherein the key value concurrency manager is further configured to manage a plurality of user queues, each user queue having an associated user queue ID.

3. The key-value based system for parallel computing of claim 1, wherein the running of the multithreaded application comprises:
    converting a file based multithread workload into a key-value based multithread workload;
    creating a first value for a first file data chunk;
    creating a first key for the first value;
    generating a first metadata that associates the first key with the first value and that maps the first key back to a first file; and
    generating a second metadata that associates the first key with a first thread ID and a first user queue ID.

4. The key-value based system for parallel computing of claim 3, wherein converting a file based multithread workload into a key-value based multithread workload comprises partitioning the first file into at least a data chunk, the data chunk being sized according to the allowable value size parameter of the key value solid state drive.

5. The key-value based system for parallel computing of claim 1, wherein one of the plurality of data threads is configured to handle input output operations for a plurality of compute threads.

6. The key-value based system for parallel computing of claim 1, wherein each of the plurality of data threads has an associated thread ID.

7. The key-value based system for parallel computing of claim 1, wherein the thread-safe asynchronous key-value input operations and output operations with the key value solid state drive are performed using a coherency management protocol.

8. The key-value based system for parallel computing of claim 7, wherein the coherency management protocol is a modified owned exclusive shared invalid ("MOESI") protocol.

9. A key-value based system for parallel computing, comprising:
an application program interface ("API");
a concurrency manager; and
a kernel device driver,
the application program interface being configured to:
receive a file;
partition the file into at least one data chunk;
assign a key to the at least one data chunk; and
create a first metadata table associating the key to the received file;
the concurrency manager being configured to:
associate, within a second metadata table, the key corresponding to the at least one data chunk with a first data thread ID and with a submission queue ID;
monitor the first data thread ID and the submission queue ID to track the status of a read or write operation being carried out using the key; and
update the second metadata table based upon completion of the read or write operation being carried out using the key; and
the kernel device driver being configured to carry out key value stores and retrievals in parallel on a key value solid state drive.

10. The key-value based system for parallel computing of claim 9, wherein the file is stored in a block solid state drive.

11. The key-value based system for parallel computing of claim 9, wherein the file is stored in the key value solid state drive.

12. The key-value based system for parallel computing of claim 9, wherein
the partitioning of the file into at least a data chunk comprises:
calculating the size of the file; and
partitioning the file up into at least one data chunk having a size determined by the size and alignment specifications of the key value solid state drive.

13. The key-value based system for parallel computing of claim 9, wherein the kernel device driver is further configured to carry out read and write operations to the key value solid state drive using a plurality of data threads, each data thread having a thread ID and a user queue ID.

14. The key-value based system for parallel computing of claim 13, wherein the data threads are operated in parallel with a plurality of compute threads.

15. The key-value based system for parallel computing of claim 14, wherein the read and write operations are carried out asynchronously by the data threads.

16. A method for operating a parallelized application, comprising:
receiving, by a processing circuit, instructions to process a file stored on a first storage device;
retrieving, by the processing circuit, the file from the first storage device;
partitioning, by the processing circuit, the file up into a plurality of data chunks;
assigning, by the processing circuit, a key for each of the plurality of data chunks;
storing, by the processing circuit, the keys and associated data chunks to a key value solid state drive using at least two parallel data threads; and
retrieving, by the processing circuit, keys and associated data chunks from the key value solid state drive using at least two parallel data threads.

17. The method of claim 16, further comprising generating, by the processing circuit, a first metadata table linking the keys to the corresponding data chunks.

18. The method of claim 16, further comprising generating, by the processing circuit, a second metadata table linking the keys to a data thread, using a thread ID associated with the thread, and to a user queue, using a user queue ID associated with the user queue.

19. The method of claim 16, further comprising managing, by the processing circuit, a task associated with at least one of the keys allocated to at least one of the data threads by enforcing that the task is completed by the data thread before another task is performed by the same thread.

20. The method of claim 16, further comprising operating, by the processing circuit, a plurality of compute threads in parallel with at least two data threads.

* * * * *